March 7, 1961 G. I. ROBERTSON 2,973,586

DEVICE FOR INSTRUCTING THE PUBLIC IN THE PROPER USE OF DIAL-EQUIPPED TELEPHONE STATION APPARATUS

Filed Dec. 21, 1954 2 Sheets-Sheet 1

INVENTOR
G. I. ROBERTSON
BY A. F. Kane
ATTORNEY

March 7, 1961 G. I. ROBERTSON 2,973,586

DEVICE FOR INSTRUCTING THE PUBLIC IN THE PROPER USE OF DIAL-EQUIPPED TELEPHONE STATION APPARATUS

Filed Dec. 21, 1954 2 Sheets-Sheet 2

INVENTOR
G. I. ROBERTSON
BY A. O. Kane
ATTORNEY 2,973,586
Patented Mar. 7, 1961

2,973,586

DEVICE FOR INSTRUCTING THE PUBLIC IN THE PROPER USE OF DIAL-EQUIPPED TELEPHONE STATION APPARATUS

Gordon I. Robertson, Madison, N.J., assignor to Bell Telephone Laboratories, Incorporated, New York, N.Y., a corporation of New York Filed Dec. 21, 1954, Ser. No. 476,744

3 Claims. (Cl. 35—8)

This invention relates to educational facilities and particularly to a training unit for instructing the public in the use and operation of telephone apparatus.

One of the contributing factors in the high percentage of so-called "lost" telephone calls is the improper operation by the public of telephone facilities such as the dial-type telephone set. Such improper use of the dial-type telephone results, to some extent, from inadequate training of the public in the correct method of operation of such equipment.

It is one object of this invention to provide an educational facility for instructing the public in the use and operation of a subscriber's dial-type telephone, which is simple, adequately comprehensive and readily adapts itself for use by non-technical personnel.

This object is attained in accordance with a feature of the invention by incorporating in a portable control cabinet means for simulating conditions encountered in the use of a dial-type telephone and for associating such cabinet with a pair of telephone sets and/or other sound reproducing and recording media.

A particular feature of the invention contemplates the inclusion, in a control cabinet, of circuitry and power facilities whereby a two-way common battery line connection may be established for the transmission of voice signals between two telephone sets.

Another feature of the invention provides means, within the control cabinet, for generating dial tone and busy tone signals, and manually operated means mounted exteriorly of the cabinet for impressing such tone signals upon a common battery line interconnecting two telephone sets.

Still another feature of the invention comprises means, within the control cabinet, for generating interrupted ringing current, and manually operated means mounted exteriorly of the cabinet for applying such current selectively to either of two telephone sets.

A further feature resides in the use of means for amplifying the generated voice and tone signals and for broadcasting them for general reception by means of a loudspeaker.

A still further feature contemplates impressing the generated voice and tone signals, in unamplified condition, on an external public address system or recording device.

Still another feature of the invention locates the manual controls on the face of the control cabinet in such a manner as to render them conveniently accessible to anyone engaged in instructing in the use and operation of the dial-type telephone.

Figure 1:
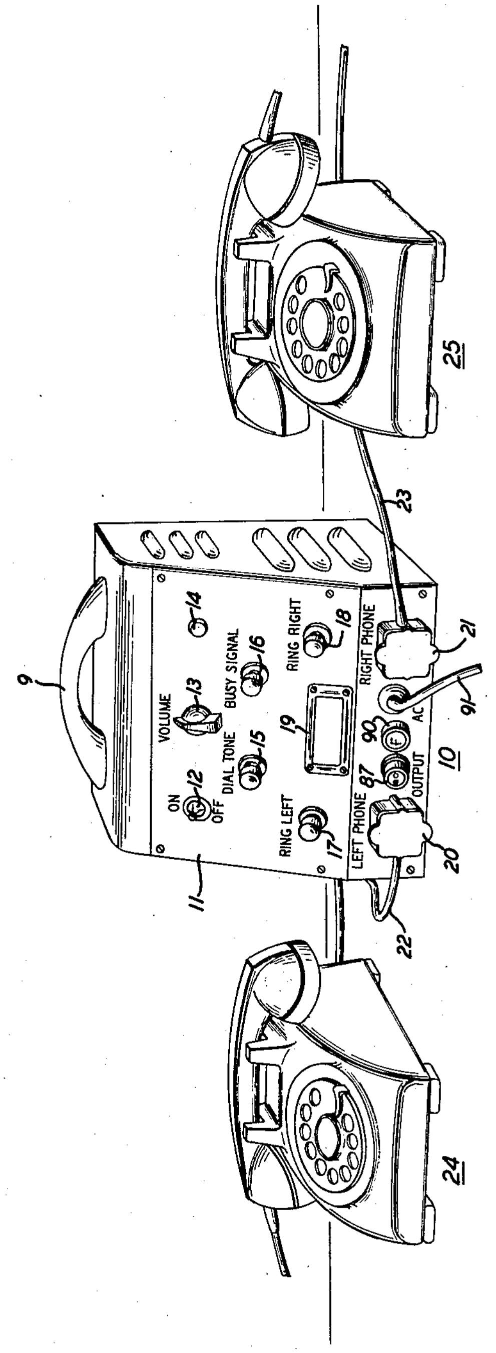
Figure 2:
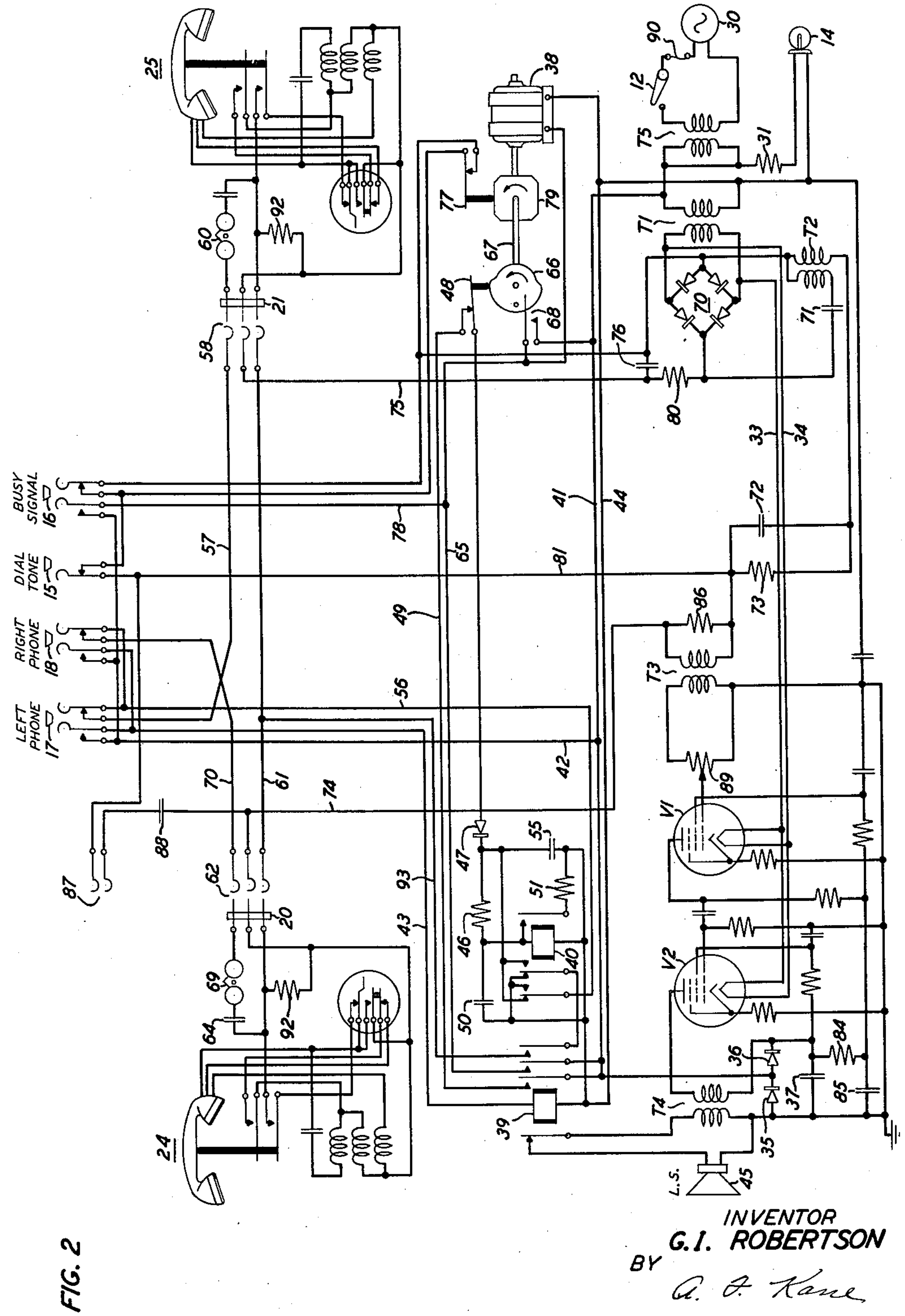

These and other features of the invention will be readily understood from the following detailed description when read with reference to the accompanying drawing, in which:

Fig. 1 is a general perspective view of the educational facility of this invention showing the configuration of the control cabinet, the location of the manual controls on the face thereof, the manner of connecting a pair of conventional dial-type telephones thereto and also other appurtenances required in the operation of the device; and Fig. 2 is a diagram showing the circuit arrangement of the equipment and wiring housed in the control cabinet and also the wiring of a pair of conventional dial-type telephone sets and the means for connecting such sets with the control cabinet equipment.

Referring particularly to Fig. 1, the control cabinet 10 constitutes a metal housing having two louvered parallel sides, a top, a base, and a rear wall. The cabinet front is substantially totally open-faced with the vertical front edges of the sides provided with flanges to which a panel 11 is removably secured by means of suitable screws. The panel consists of a lower vertical portion and an upper sloping area, the former serving to mount a pair of jacks which accommodate the telephone set plugs 20 and 21, an output jack 87, a fuse 90 and a power cord 91, while the latter supports an On-Off switch 12, a volume control switch 13, a pilot lamp 14, a dial tone push button 15, a busy signal push button 16, a pair of ringing keys 17 and 18, and a card holder 19. The cabinet top supports a handle or hand grip 9 which renders the cabinet conveniently portable. The functions of the various instrumentalities mounted on the panel 11 and just identified will be described in greater detail hereinafter.

The plugs 20 and 21 terminate the cords 22 and 23, respectively, which together provide means whereby the telephone sets 24 and 25, respectively, may be connected to the control cabinet 10. The telephone sets are dial-type sets of any conventional design slightly modified by the inclusion of the resistors 92 as shown. These resistors are in parallel with the speech path through the telephone instruments, are of low resistance and are required to insure a closed circuit condition when either of the handsets is removed from its support.

It is understood that the apparatus and wiring disclosed diagrammatically in Fig. 2, excluding the telephone sets, are mounted in any suitable manner on a chassis which may be formed integrally with the panel 11 and slidable therewith into and out of the cabinet interior.

The "Teletrainer," as the device of this invention is aptly designated, is particularly adapted for use in classrooms, auditoriums and similar other areas in which groups of prospective telephone users or trainees may be be assembled for instruction purposes. In order to condition the device for demonstration or instruction purposes it is necessary only that the cord 91, which is plug-ended, be connected to a suitable 115-volt, alternating-current outlet, the plugs 20 and 21 inserted in corresponding jacks 62 and 58 (Fig. 2) and the switch 12 operated to its ON position. A two-way common battery line is thereupon established between the two telephone sets.

To simulate the transmission of dial tone which occurs when a telephone handset is removed from its cradle support in initiating a call at a subscriber station of the dial type, the key 15 is operated by the instructor whereupon dial tone generated by means contained in the cabinet 10 is transmitted over the established common battery line for reproduction in the receivers of the two telephones. This serves to acquaint or familiarize trainees or prospective telephone users with the sound of the signal employed to notify the telephone user that the central office automatic switching equipment is in readiness to receive dial pulses corresponding to the line designation of a called station and that the dial may be operated accordingly.

As is well known to users of the telephone, a distinctive tone signal is heard in the telephone receiver at a call-originating station when a call, so originated, encounters a busy condition. In the device of this invention such a tone signal is simulated and caused to be transmitted over the common battery line and reproduced in the receivers of each of the telephones 24 and 25 when the busy signal key 16 is operated.

To illustrate the ringing or signaling of a subscriber station by which the arrival of a call at the station is manifested, one of the keys 17 and 18 is operated to cause the operation of the ringer associated with the corresponding telephone set 24 or 25.

A direct talking connection between the telephones 24 and 25 is completed when the handsets of such telephones are lifted from their respective cradle supports and conversation between trainees utlizing such telephones may be carried on by way of the common battery line.

The system of this invention contemplates the amplification and broadcasting of all speech and tone signals by means of a loudspeaker housed in the control cabinet. In this manner such signals may be heard and studied by reasonably large groups located in the vicinity of the "Teletrainer." To serve still larger groups of trainees or prospective telephone users, facilities are provided for connecting the unamplified speech and tone signal output to an external public address system.

Referring now more particularly to Fig. 2, the various functional aspects of the "Teletrainer" and the circuit operations involved in its use, will be described in detail.

*Power-on condition*

To enable the "Teletrainer," the key 12 is operated to its ON position thereby causing 115-volt alternating current from the source 30 to be supplied to the primary winding of isolation transformer T5. A neon pilot lamp 14 thereupon is lighted over an obvious circuit which includes the secondary winding of transformer T5 and resistor 31. The lighting of lamp 14 appraises the user of the "Teletrainer" of the fact that power has been applied and the instruction set is ready for use.

Incident to the closure of the contacts of key 12, the filaments of amplifier tubes V1 and V2 are energized by way of conductors 33 and 34 which are connected to opposite terminals of the secondary winding of transformer T5. Also a voltage doubler, comprising varistors 35 and 36 and capacitor 37, is energized and 115-volt alternating current is supplied for later operation of motor 38, signal relay 39 and ringing relay 40.

*Signaling*

When it is desired to connect ringing current to telephone 24, the "ring left" push button 17 is actuated, whereupon relay 39 operates in a circuit extending from the upper terminal of the secondary winding of transformer T5, over conductors 41 and 42, closed left contacts of key 17, conductor 43, winding of relay 39, conductor 44 to the lower terminal of the secondary winding of transformer T5.

Relay 39, at its left armature and front contact, opens the circuit to loudspeaker 45. At its innermost right armature and front contact relay 39 prepares a circuit for operating capacitor-timed relay 40 which extends from the lower terminal of the secondary winding of transformer T5, over conductor 44, through the winding of relay 40, resistor 46, varistor 47, break contacts of microswitch 48, conductor 49, front contact and innermost right armature of relay 39, conductor 41 to the upper terminal of the secondary winding of transformer T5.

Relay 40 does not operate until the potential across capacitor 50, which is bridged across the winding of relay 40 and which charges through varistor 47 and resistor 46, increases to a sufficient value to allow operating current to flow through its high resistance winding. When relay 40 eventually operates, low resistance resistor 51 is shunted across its winding by way of its right armature and front contact thereby causing condenser 50 to discharge, thus lowering the current through the winding of relay 40 below the hold value. Relay 40 thereupon releases removing the shunt resistor 51 and permitting the capacitor 50 to again charge. This action is repeated causing relay 40 to operate and release at a rate approximately twenty times per second.

Each time relay 40 operates the following circuit is completed:

From the upper terminal of the secondary of transformer T5 over conductor 41, the innermost right armature of front contact of relay 39, conductor 49, contacts of microswitch 48, varistor 47, thence by way of two paths, one including condenser 55, the front contact and outer left armature of relay 40, conductor 56, closed right contacts of key 18, conductor 70, upper terminal of jack 62 and corresponding terminal of plug 20, to one side of the ringer 69, and the other including the front contact and inner left armature of relay 40, outermost right armature and front contact of relay 39, conductors 93 and 61, to the lowermost terminal of jack 62 and the corresponding terminal of plug 20 to the other terminal of ringer 69 by way of capacitor 64. Each time relay 40 releases, the connections of conductors 57 and 61 with respect to condenser 55 and varistor 47 are reversed so that alternating polarity output from the inner left armature of relay 40 is connected to the conductor 61 and alternating polarity output from the outer left armature of relay 40 is connected to conductor 56 and thence to conductor 70. Thus, simulated ringing current having a frequency of 20 cycles per second is applied to the ringer 69 associated with the telephone 24 which current is interrupted to effect a ringing interval of two seconds spaced by a silent interval of four seconds in a manner now to be described.

When relay 39 operates, motor 38 is energized in a circuit extending from the lower terminal of the secondary of transformer T5, through the winding of motor 38, over conductor 65, front contact and middle right armature of relay 39, conductor 41, to the upper terminal of the secondary of transformer T5. Under control of cam 66, fixed to shaft 67 which is driven by motor 38, the microswitch 48 is operated intermittently to provide a two-second make and a four-second break in the operating circuit of relay 40 so that the simulated 20-cycle ringing current generated by the action of relay 40 is applied to the ringer 69 for two-second periods interspaced by silent periods of four seconds. This ringing current will be applied to the ringer 69 as long as the key 17 is held operated.

When key 17 is released, relay 39 releases, opening the operating path of relay 40 and terminating the transmission of ringing current to the ringer associated with the telephone 24. The motor 38 continues to operate until it reaches normal position, that is when the contacts of microswitch 48 are in their closed position, under control of the off-normal make contacts of microswitch 68.

It is apparent that ringer 60 associated with the telephone 25 may be operated in a similar manner by actuating the corresponding push button key 18. It is not deemed necessary to describe in detail the operation of ringer 60 incident to the actuation of key 18 since to do so would constitute a substantial repetition of the proceeding description. It is well to note, however, that the conductor 61 is common to both telephone sets and that the circuit to ringer 60 is completed over conductor 57 by way of the normally closed contacts of key 17.

*Dial tone signal*

To apply dial tone to the telephone sets it is necessary only to actuate the dial tone key 15 and dial tone will be heard in the receivers of the telephone sets 24 and 25, assuming that the ON-OFF switch 12 is operated to its ON position.

When switch 12 is operated to its ON position, the power from source 30 is impressed on the primary winding of step-down transformer T1 by way of isolation transformer T5 so that 6.3-volt, 60-cycle current is supplied from transformer T1 to the full-wave rectifier 70. This rectifier produces direct-current pulses at the rate of 120 pulses per second which flow through capacitor 71 by way of the primary winding of tone transformer T2. Output from the secondary of transformer T2 is shaped by the wave shaping network comprising capacitor 72 and resistor 73 to produce a current which approximates dial tone. This tone current flows in a closed series circuit including the secondary winding of tone transformer T2, the network including capacitor 72 and resistor 73, the primary winding of amplifier transformer T3 to the center terminal of jack 62 by way of conductor 74, the corresponding terminal of plug 20, thence through resistor 92, conductor 61, the lower terminal of jack 58 and the corresponding terminal of plug 21, through resistor 92 to the center terminal of plug 21 and the corresponding terminal of jack 58, conductor 75 and capacitor 76, to the upper terminal to the secondary winding of tone transformer T2.

The dial tone circuit just traced is normally disabled by the closed contacts of the dial tone key 15 in series with the contacts of microswitch 77 which shunt the secondary winding of tone transformer T2 and the serially connected network consisting of capacitor 72 and resistor 73. Dial tone is therefore excluded from the common battery line circuit until key 15 is depressed to open the shunt circuit just described. When the key 15 is operated, steady 120-cycle dial tone is impressed on the talking circuit of the connected telephone sets 24 and 25.

It will be observed that transformer T3 is the input transformer to the amplifier comprising tubes V1 and V2, the output transformer T4 of which is connected to the loudspeaker 45 so that, as will be referred to in greater detail hereinafter, the dial tone may be amplified and broadcast by way of the loudspeaker when relay 39 is in its unoperated condition.

*Busy tone signal*

The 120-cycle tone source employed for dial tone signaling purposes is also used as a busy tone signal source. To project this tone on the common battery line interconnecting the telephone sets 24 and 25 it is only necessary that the busy signal key 16 be depressed. When this operation is performed, motor 38 is energized in a circuit extending from the lower terminal of the secondary winding of transformer T5, through the windings of motor 38, over conductor 78, the left contacts of key 16, conductors 42 and 41 to the upper terminal of the secondary winding of transformer T5. The break contacts of microswitch 77, actuated by cam 79 which is driven by the now energized motor 38, open and close the tone disabling path hereinbefore described in connection with the transmission of dial tone. The 120-cycle tone, thus interrupted to simulate busy tone, is supplied to the common battery line between the telephone sets 24 and 25 and also to the amplifier input transformer T3 as is now apparent. The right break contacts of key 16 shunt the break contacts of the microswitch 77 to instantly terminate the tone signal when the key 16 is released. The motor 38 runs to normal position, that is until contacts 48 close, under the control of the off-normal make contacts of microswitch 68.

*Talking*

For talking purposes it is only necessary to remove the telephone handsets from their supports, assuming the plugs 20 and 21 have been inserted in the corresponding jacks 62 and 58 and the switch 12 has been operated to its ON position. Talking battery is furnished by the full-wave rectifier 70 and the filter network comprising capacitor 76 and resistor 80. The talking path between the telephone sets, whether or not the handsets are removed from their supports, is a closed series path extending from the center terminal of jack 62, over conductor

74, through the primary winding of amplifier input transformer T3, conductor 81, normal break contacts of dial tone key 15, normal break contacts of busy signal key 16, capacitor 76, conductor 75, to the center terminal of jack 58.

*Loudspeaker operation*

The loudspeaker 45 is employed to reproduce speech and tone signals in amplified form. When the key 12 is operated to circuit closing position, current from the secondary of filament transformer T1 heats the filaments of amplifier tubes V1 and V2 while plate voltage is supplied by the voltage doubler comprising varistors 35 and 36 and capacitor 37, through the filter comprising resistor 84 and capacitor 85. Thus the amplifier is enabled and amplifies any and all signals which transverse the primary winding of the input transformer T3 and impresses them in amplified condition on the primary of output transformer T4, the secondary winding of which is connected to the loudspeaker 45 when relay 39 is in its normal unoperated condition, which is at all times except during the transmission of ringing signals. Dial and busy tones, as well as speech signals are, therefore, reproduced by the loudspeaker as well as by the receiver elements of the handsets of the telephones 24 and 25. The resistor 86 is used to load the primary of the input transformer T3 to minimize singing.

The amplifier, as illustrated, may be a conventional resistance coupled, two-stage circuit with input and output transformers. The input signal may be controlled by the potentiometer 89.

*External public address system*

Signals appearing across the primary of amplifier input transformer T3 also appear at the terminals of jack 87 in series with the blocking capacitor 88 so that such signals, if desired, may be broadcast by way of an external public address system by plugging such a system into the jack 87. If desired, a recording device may be connected to the control cabinet by way of the jack 87 in order to record speech and tone signals generated by the "Teletrainer."

What is claimed is:

1. A device for instructing the public in the use of a subscriber's telephone set comprising a cabinet, means for connecting a pair of telephone sets to said cabinet, means for supplying alternating current to said cabinet, and electrical circuitry within said cabinet, said electrical circuitry including means including first manual key means mounted on said cabinet for deriving simulated ringing signals from said alternating current and applying said simulated ringing signals to said telephone sets, means incuding second manual key means mounted on said cabinet for deriving simulated dial tone from said alternating current and applying said simulated dial tone to said telephone sets, means including third manual key means mounted on said cabinet for deriving simulated busy tone from said simulated dial tone and applying said simulated busy tone to said telephone sets, means for deriving talking battery voltage from said alternating current and applying said battery voltage to said telephone sets, and means for interconnecting said telephone sets in a talking path.

2. A device in accordance with claim 1 further including amplifier and loudspeaker means responsive to said simulated dial and busy tones and connected to said talking path, and means for disabling said loudspeaker means during application of said simulated ringing signals to said telephone sets.

3. A device for instructing the public in the use of a subscriber's telephone set comprising a cabinet, means for connecting a pair of telephone sets to said cabinet, means for supplying alternating current to said cabinet; and electrical circuitry within said cabinet, said electrical circuitry including means for deriving simulated ringing signals from said alternating current and applying said simulated ringing signals to said telephone sets, said last-mentioned means including a relay, a first microswitch, motor means for periodically operating said first microswitch, a pair of contacts of said relay for energizing said motor means from said alternating current applying means, and first manual key means for operating said relay and for applying said simulated ringing signals to either of said telephone sets; means for deriving simulated dial tone from said alternating current and applying said simulated dial tone to said telephone sets, said last-mentioned means including a rectifier network electrically connected to said alternating current supplying means, a transformer and resistor-capacitor network connected between said rectifier network and said telephone sets, and second manual key means normally in shunt across said transformer and resistor-capacitor network; means for deriving simulated busy tone from said simulated dial tone and applying said simulated busy tone to said telephone sets, said last-mentioned means including a second microswitch and third manual key means for energizing said motor means to operate said second microswitch periodically; means for deriving talking battery from said alternating current and for applying said talking battery to said telephone sets including said rectifier network and a filter network; and means for interconnecting said telephone sets in a talking path.

References Cited in the file of this patent

UNITED STATES PATENTS

| | | |
|---|---|---|
| 1,835,778 | Huenlich | Dec. 8, 1931 |
| 2,321,799 | Cone | June 15, 1943 |

OTHER REFERENCES

Stromberg-Carlson Telephone Switchboards, B Edition Catalogue, received July 14, 1948, pertinent pages 66–71 and 92.